Figure 8:
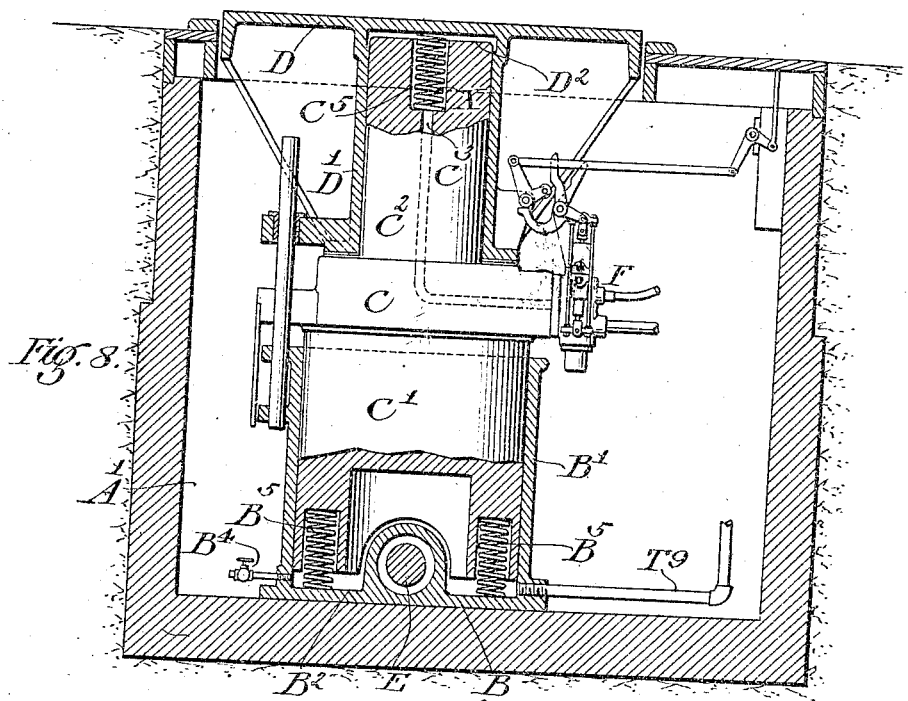

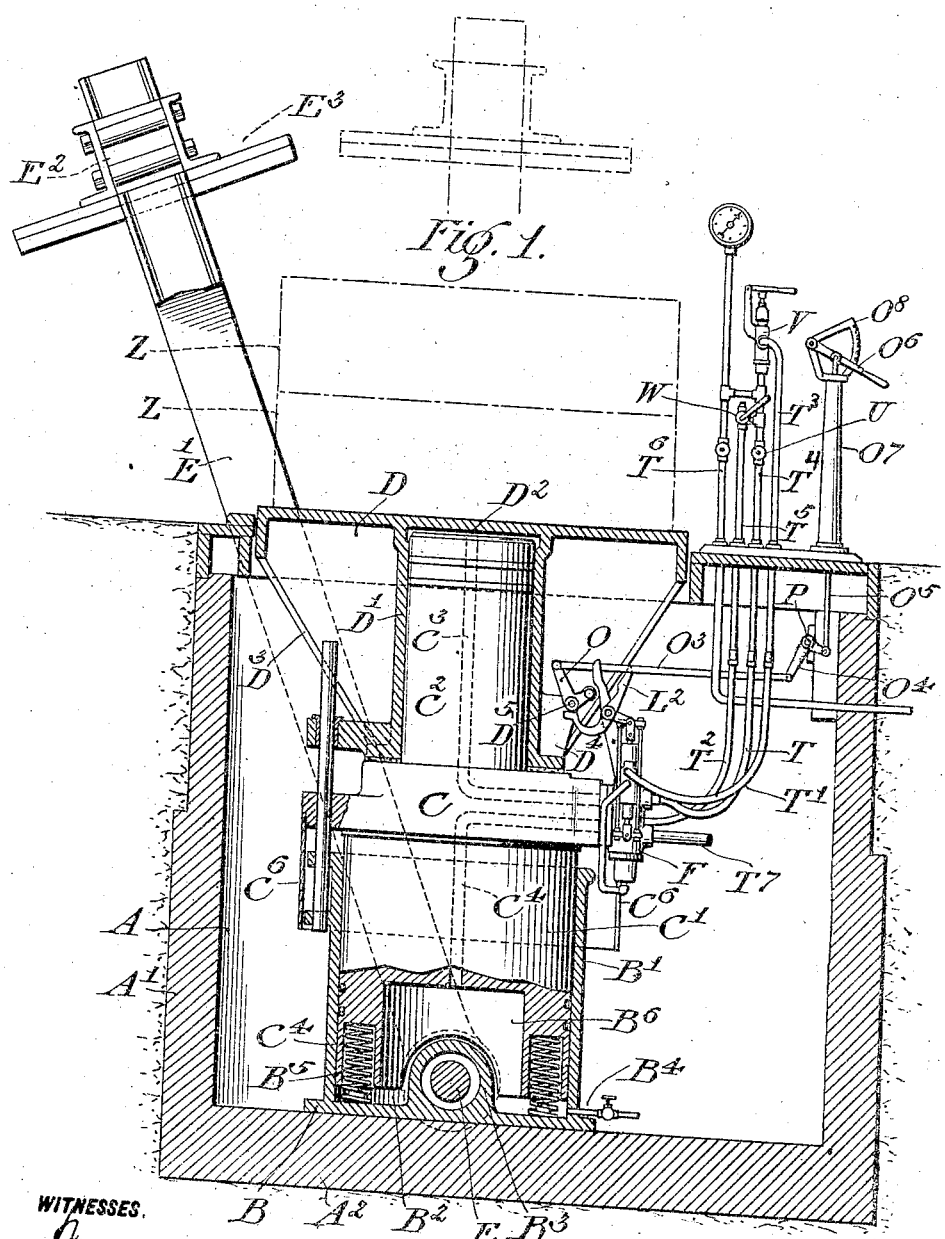

W. LEWIS.
MOLDING MACHINE.
APPLICATION FILED NOV. 29, 1909.
1,055,336.
Patented Mar. 11, 1913.
5 SHEETS—SHEET 2.
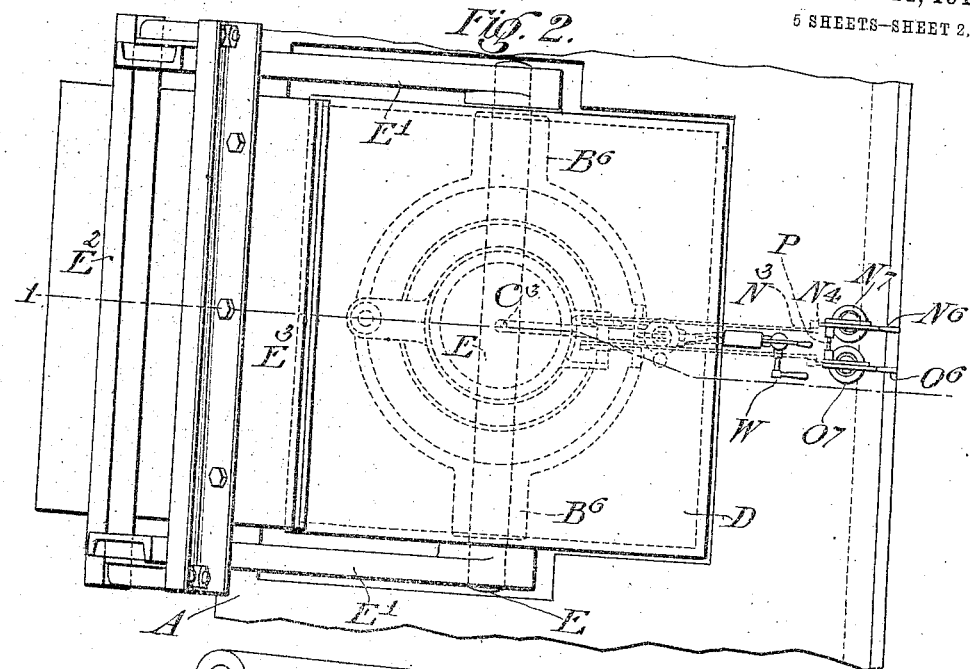
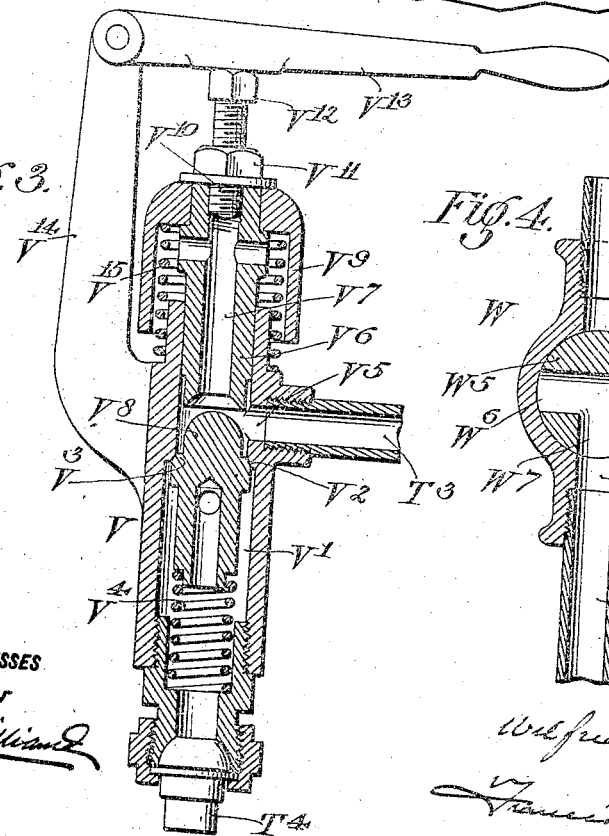
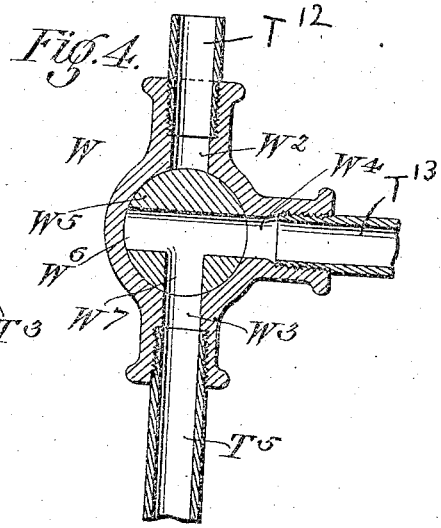

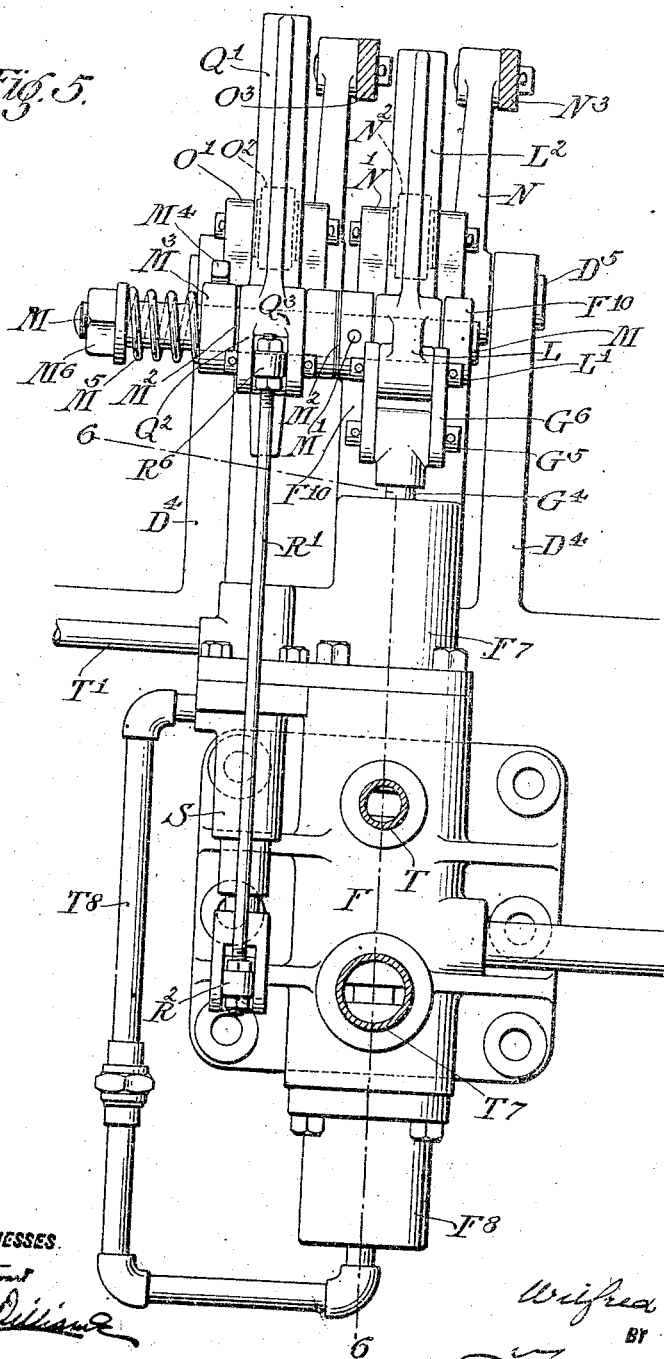
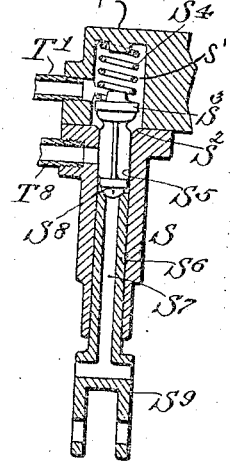

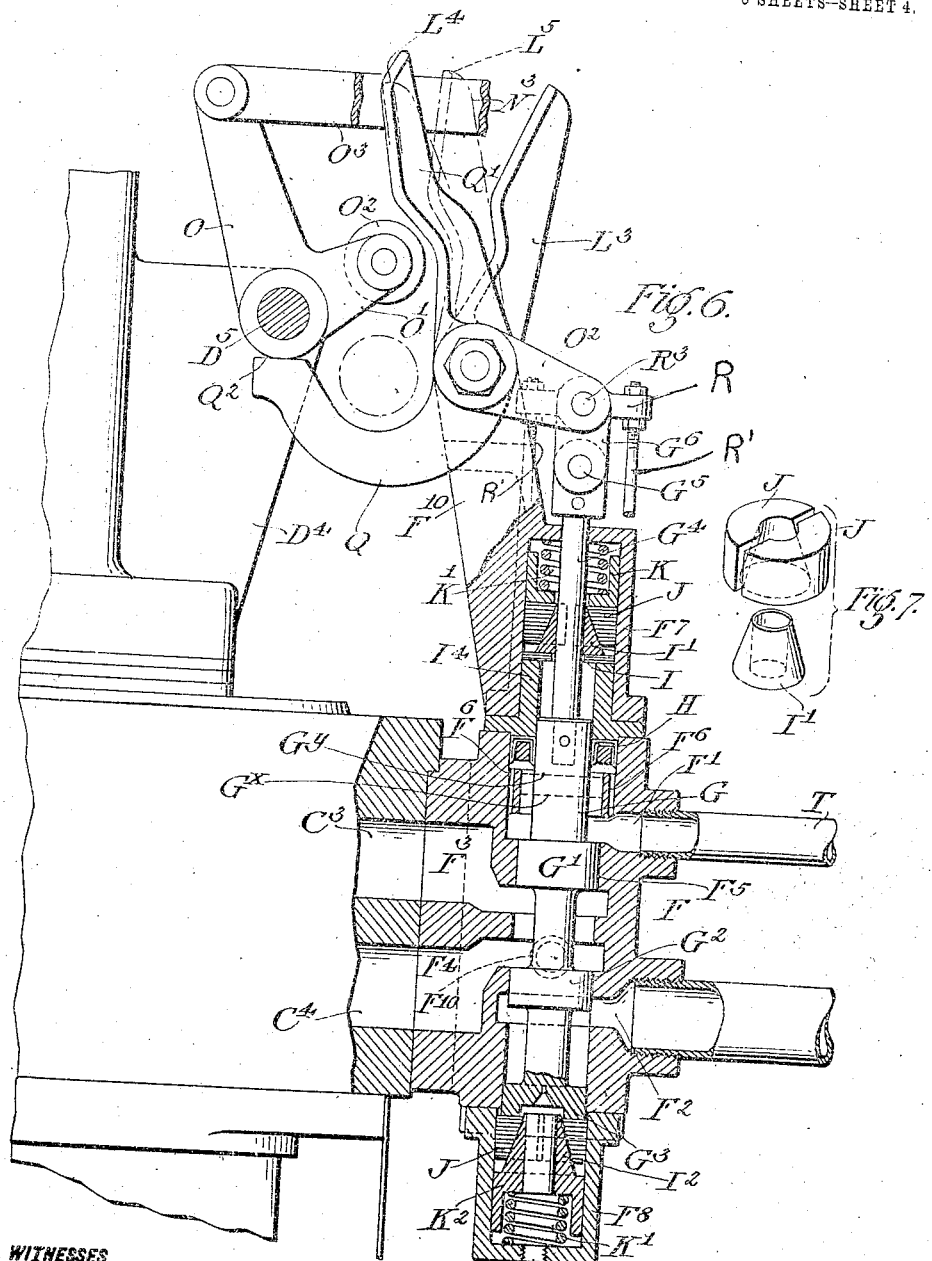

W. LEWIS.
MOLDING MACHINE.
APPLICATION FILED NOV. 29, 1909.

1,055,336.

Patented Mar. 11, 1913.
5 SHEETS—SHEET 5.

WITNESSES

INVENTOR
Wilfred Lewis
BY
his ATTORNEY.

UNITED STATES PATENT OFFICE.

WILFRED LEWIS, OF PHILADELPHIA, PENNSYLVANIA, ASSIGNOR, BY MESNE ASSIGNMENTS, TO THE TABOR MANUFACTURING COMPANY, OF PHILADELPHIA, PENNSYLVANIA, A CORPORATION OF PENNSYLVANIA.

MOLDING-MACHINE.

1,055,336.      Specification of Letters Patent.      Patented Mar. 11, 1913.

Application filed November 29, 1909. Serial No. 530,343.

*To all whom it may concern:*

Be it known that I, WILFRED LEWIS, a resident of the city and county of Philadelphia and State of Pennsylvania, have invented a new and useful Improvement in Molding-Machines, of which the following is an exact and true description, reference being had to the accompanying drawings, which form a part thereof.

My present invention relates to molding machines of the kind in which a relatively movable mold support and anvil are employed, and in which the mold support is alternately lifted above and then allowed to fall back into collision with the anvil in order to compact the sand or other mold forming material about the pattern or patterns resting upon the mold support.

The general object of my present invention is the provision of a molding machine of the type specified, characterized in its general operation by its economy in the consumption of air or other elastic fluid under pressure employed, as is usual, in such machines to lift the mold support above the anvil preparatory to collision, and characterized also by the excellency of its operation as mold forming apparatus.

More specific objects of the invention are to provide a novel, effective, and reliable valve mechanism which includes a connection for limiting the stroke of the mold support relative to the anvil, and a connection for cutting off the admission of pressure fluid prior to the instant at which the mold support reaches the upward limit of its movement whereby the air is employed expansively, each of said connections being of such character that they may be readily operated while the machine is in operation and without interrupting its operation.

Another object of the invention is to provide, with a jar molding machine proper, a squeezing abutment and means more suitable than the piston and cylinder by which the mold support is lifted off the anvil preparatory to collision for moving the mold support relative to the abutment to squeeze the molds supported on the mold support and thereby to supplement the jarring action in compacting the mold forming material. This I accomplish preferably by utilizing for lifting the mold support in the squeezing operation the piston and cylinder connection between the relatively movable anvil and base of the machine provided for minimizing the transmission to the foundation of the shock of collision which may advantageously be employed for avoiding the transmission of the shock of collision to the foundation as disclosed and claimed in my Patent No. 941,999 granted November 30, 1909.

Another object of the invention is the provision of means for retarding the downward acceleration of the mold support during the falling movement of the latter, so that the acceleration is less than the full acceleration of gravity, whereby the sand or other mold forming material bears with considerable firmness against the patterns during this portion of the operation.

Other objects of the invention will appear in connection with the accompanying drawings and the detailed description in the specification of the apparatus specifically disclosed, and for a full understanding of the invention, reference should be had to such drawings and descriptive, as well as the annexed claims, in which I have aimed to describe with particularity the various features of novelty characterizing my invention.

Figure 9:
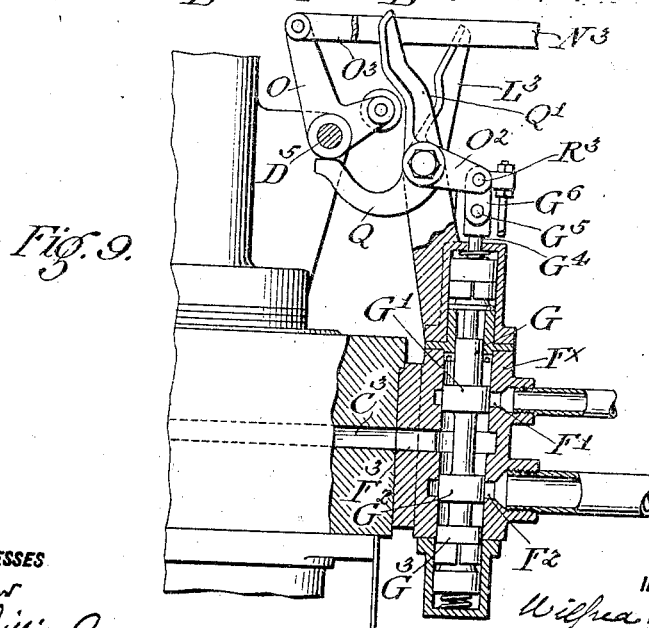

Of the drawings, Figure 1 is an elevation, partly in section, on the line 1—1 of Fig. 2, showing one form of molding machine embodying the present invention. Fig. 2 is a plan of the apparatus shown in Fig. 1. Fig. 3 is a sectional elevation of the hand controlled pilot valve employed for controlling the operation of the machine in jar ramming a mold. Fig. 4 is a sectional elevation of a three way valve which may be employed in squeezing a mold. Fig. 5 is a partial elevation of the molding machine of Fig. 1, the view being taken from the right of Fig. 1, and being on a larger scale than Fig. 1. Fig. 5ª is a sectional elevation of a pilot valve shown in Fig. 5. Fig. 6 is an elevation, partly in section, on the broken line 6—6 of Fig. 5. Fig. 7 is a perspective view illustrating certain details of the main valve mechanism. Fig. 8 is a view similar to Fig. 1, illustrating a modified construction; and Fig. 9 is a partial sectional elevation taken similarly to Fig. 6 showing a slightly modified main valve construction.

In the drawings, and referring first to the construction shown by Figs. 1 to 8, inclusive, B represents the base of the molding machine which, in the installation represented by the drawings, rests on the bottom wall $A^2$ of a pit A, the side wall $A'$ of which, as well as the bottom wall, may be formed of masonry, preferably concrete. The base B is provided with an upstanding cylinder portion $B'$ open at its upper end and receiving the enlarged piston $C'$ formed at the bottom of the anvil C. On its upper side the anvil is provided with an upstanding piston $C^2$ entering the cylinder space $D^2$ of the cylinder $D'$ formed on the under side of the mold support D. The upper table portion of the mold support D may be on substantially the same level as the upper end of the pit A. The mold support has its table and cylinder portions connected by the usual stiffening ribs $D^3$. The anvil and mold support, as well as the load supported by the latter, are carried by a resilient cushion for the purpose of improving the operation of the machine and in particular of avoiding the transfer of the shock of collision to the foundation in the manner described and claimed in my prior Patent No. 941,999. In the construction shown in Fig. 1 this cushion is formed in part by the springs $B^5$ which enter sockets $C^4$ formed in the lower end of the anvil portion $C'$ and have their lower ends bearing on the bottom wall of the cylinder space $B^2$. These springs are of sufficient strength to support the parts in about the position shown in Fig. 1 when the machine is at rest, sustaining its full load; i. e., flasks Z, indicated in dotted lines in Fig. 1, and their contents, patterns, mold forming material, etc., not shown.

In the operation of the machine shown in Fig. 1, the cushion action of the springs $B^5$ is augmented as hereinafter described by fluid under pressure admitted to the cylinder space $B^2$ through the port $C^4$. The port $C^4$, as well as the port $C^3$ leading to the upper end of the piston $C^2$ and communicating with the cylinder space $D^2$, lead to one side of the anvil proper where they register with the ports $F^4$ and $F^3$ respectively, of the main casing of the valve F which directly controls the admission to and exhaust from the machine of the pressure fluid in the jar ramming operation. As shown, the casing of valve F is formed with a cylindrical passage $F^5$ for a piston valve. The port $F'$ represents the inlet port which leads to the passage $F^5$ above the port $F^3$ and the exhaust port proper $F^2$ leads from the passage $F^5$ below the port $F^4$.

The valve G comprises a piston portion $G'$, a piston portion $G^2$, a piston portion $G^3$, connecting portions of reduced diameter, and a body portion above the piston $G'$ which projects through the end wall of the valve chamber $F^5$, a packing H preventing leakage from the chamber $F^5$. In Fig. 1 the valve is shown in the lowermost of its three operative positions, in which the ports $F^3$ and $F^4$ are in communication and the piston portions $G'$ and $G^2$ close communication between ports $F^3$ and $F'$ and between ports $F^4$ and $F^2$, respectively. In an intermediate position, in which the top of the valve portion $G'$ touches the dotted line $G^x$, the portion $G'$ still closes communication between the ports $F'$ and $F^3$ and the portion $G^2$ closes communication between the port $F^4$ and the port $F^3$ and permits communication between the port $F^4$ and the port $F^2$. In the third and uppermost position of the valve the top of the valve portion $G'$ touches the dotted line $G^4$ and the ports $F'$ and $F^3$ are in communication, and the valve portion $G^2$, while closing communication between ports $F^3$ and $F^4$, permits free communication between port $F^4$ and the exhaust port $F^2$. Channels $F^6$ communicating at their lower end with the inlet port $F'$ are open at their upper ends to the valve passage $F^5$, so that the piston area at the upper end of the piston portion $G'$ surrounding the body of the valve G is at all times acted upon by the pressure supplied to the port $F'$, and consequently always tends to move the valve downward into the portion shown in Fig. 1. The valve is moved up from the position shown in Fig. 1 by pressure fluid admitted to the lower end casing $F^8$ of the valve through the port $F^9$ and acting against the underside of the piston $G^3$, the area of which, as shown, is substantially greater than the difference between the cross sectional areas of the piston portion $G'$ and the portion of the valve above $G'$. The stem $G^4$ connected to the upper end of the valve forms a means by which the valve may be moved, as hereinafter described, into the intermediate position against the action of the fluid pressure on the underside of the piston $G^3$.

The molding machine disclosed is adapted to operate very rapidly in jar ramming. This requires a rapid reciprocation of the valve G, and I have found it necessary to devise suitable means for arresting the movement of the valve at the ends of its strokes. The means for checking the upward movement of the valve comprises a spring $K'$ bearing at its upper end against the end wall of the upper end casing $F^7$ of the valve, a follower K, a pair of segments J which may advantageously be formed of wood or like material, and have inner conical surfaces receiving the conical spreader $I'$ which rests on the follower I preferably formed of nonmetallic material. The follower I rests on the sleeve $I^4$ in the condition of the apparatus shown in Fig. 1, and is engaged by the upper end of the valve G when the valve moves to its upward position. In normal position this engagement is violent and gives some upward movement to the spreader I'. This is arrested partly by the direct action of spring K' but largely by the friction between the inner wall of the end casing $F^7$ and the outer cylindrical surfaces of the segments J. In consequence, there is much less tendency toward a rebound of the valve than would be the case if the motion of the valve were restored entirely by a spring such as the spring K'. A similar arrangement is employed for checking the downward movement of the valve. In this case, however, the wider ends of the segments J bear directly against the underside of the piston $G^3$ and the conical spreader portion $I^2$ is formed integrally with the follower portion $K^2$ against which the upper end of the spring K' acts. The advantage of suitable means for cushioning the movements of the valve and the avoidance of rebound will be obvious, particularly when it is understood that these valves may be quite heavy in large sized machines, and I should explain that this invention is particularly adapted for use in connection with jar molding machines of the largest type now known, and indeed in jar molding machines larger than any which have heretofore been put into use, although the invention is of value also in connection with small and moderate sized machines.

The admission of pressure fluid to and its exhaust from the chamber in the lower end casing $F^8$ is controlled by a valve S (Fig. 5$^a$). The valve S in the form shown comprises a casing formed in part by a portion of the end casing $F^7$ of the main valve in which the inlet chamber S' of the valve S is formed. The outlet chamber $S^5$ of the valve is in alinement with the inlet chamber S' and is formed in a casing body secured to the underside of the end casing $F^7$. A valve $S^3$ is normally urged toward its seat $S^2$ to close communication between the chambers S' and $S^5$ by a spring $S^4$. The valve $S^3$ may be moved off its seat by means of a spindle $S^6$ engaging the lower end portion $S^8$ of the valve member proper. The spindle $S^6$ is provided with a yoke $S^9$ to which the crosshead $R^2$ is pivotally connected. The spindle $S^6$ is hollow and the passage $S^7$ in it is open at its lower end to the atmosphere. When the spindle $S^6$ is moved up it holds the valve $S^8$ off the seat $S^2$, thus connecting the chambers S' and $S^5$. As shown in Fig. 5$^a$, the portion $S^8$ of the valve member proper forms a valve seating on the upper end of the spindle $S^6$ and closing communication between the outlet chamber $S^5$ of the valve and the passage $S^7$ running to the atmosphere when the spindle holds valve $S^3$ off its seat. When the valve spindle $S^6$ is depressed, however, and the valve member $S^3$ engages the seat $S^2$ the upper end of the spindle $S^6$ is moved away from the valve portion $S^8$ and the outlet chamber $S^5$ is open to the atmosphere. Fluid under pressure is supplied to the chamber $S^4$ by the pipe section T' hereinafter referred to. The pipe $T^8$ leads from the outlet chamber $S^5$ of the valve to the port $F^9$ in the lower end casing of the main valve. The valve S is operated by connecting rods R' extending between the crosshead $R^2$ connected to the operating member of the valve S, and a crosshead R pivotally connected by a pin $R^3$ to the arms $Q^2$ of a lever Q journaled on a shaft M supported in ears $F^{10}$ forming projections from the end casing $F^7$. The shaft M is rigidly connected to the ears $F^{10}$ as by the pin M' and the turning movement of the lever Q on its shaft M is opposed by frictional means comprising suitable frictional washers $M^2$ located one between the end of the hub $Q^3$ of the lever Q and the adjacent ear $F^{10}$ and the other between the hub and a follower $M^3$ splined on the shaft M and spring pressed toward the lever by a spring $M^5$ extending between the follower $M^3$ and the nut $M^6$ on the threaded end of the shaft M. The lever Q is turned on the shaft M in one direction when by means of a projection $Q^2$ of the lever which engages a stop carried by the mold support when the anvil and mold support engage. This turns the lever Q into the position in which fluid under pressure is admitted to the end casing $F^7$ to thereby move the valve G to the upper limit of its movement. I should explain that the apparatus of Figs. 5 and 6 is in the position in which the pilot valve is in condition to cause the movement of the valve G to its uppermost position but in which the movement of the valve G has not yet begun. In the form shown, the stop carried by the mold support which is engaged by the lever portion $Q^2$, as described, is the hub of a bell crank lever O journaled on a shaft $D^5$ carried by the bracket ears $D^4$ of the mold support. One arm O' of the bell crank lever O is bifurcated to receive a cam roll $O^2$ pivotally supported by the lever arm O'. The cam $O^2$ engages the lever arm Q' of the lever Q on a predetermined upward movement of the mold support relative to the anvil to thereby shift the valve S into position to connect the port $F^9$ and the chamber in the end casing $F^8$ to exhaust to permit the casing G to return to the position shown in Fig. 5. The amount of relative movement of the mold support and anvil necessary to bring about the operative engagement between the cam roll $O^2$ and the lever arm Q' may be adjusted to thereby adjust the stroke of the mold support by means of a connecting rod $O^3$ connected at one end to the bell crank lever $O$ and at the other end to a bell crank lever $O^4$ pivoted on a stationary shaft $P$. The lever $O$ is connected also by the connecting rod $O^5$ to an operating lever $O^6$ which is pivoted to and workable along a quadrant $O^8$ supported by a stand $O^7$. The stand $O^7$ may be located at any convenient point, for instance, as shown, at the side of the molding machine proper on the flooring covering the pit in which the molding machine is received.

The stem $G^4$ of the valve $G$ is pivotally connected by pins $G^5$ to links $G^6$ connected in turn by the pin $L'$ to the arm $L$ of a bell crank lever which is journaled on the shaft $M$ between the ears $F^{10}$. The other arm $L^2$ of this lever moves relative to the anvil with the valve $G$, and when the latter is in its uppermost position the lever $L^3$ is in the dotted line position indicated in Fig. 6 at $L^4$. It may be moved from the dotted line position $L^4$ into the dotted line position $L^5$ at any desired point in the upstroke of the mold support relative to the anvil, however, by the cam roll $N^2$ of a bell crank lever $N$ which may be substantially identical with the bell crank lever $O$ and like the latter be journaled on the shaft $D^5$ and connected by a connecting rod $N^3$ to a bell crank $N^4$ also journaled on the shaft $P$ and connected through a suitable connecting rod to the operating lever $N^6$ supported on a stand $N^7$. The stand $N^7$ as shown in Fig. 2 may be located alongside the stand $O^7$ and it will be apparent without further explanation that by operating the levers $O^6$ and $N^6$ the point of cut off of the pressure fluid and the length of stroke of the mold support movement relative to the anvil may be adjusted as desired while the machine is in operation and without interfering with its operation. While the anvil itself has a limited vertical movement this is not sufficient to disturb adjustment of the levers $O$ and $N$ with the relatively long connecting rods $O^3$ and $N^3$ shown.

The air for producing the relative movement of the anvil and mold support in jar molding is supplied to the port $F'$ of the valve casing $F$ by a flexible pipe section or hose $T$ from a pipe $T^3$ forming a branch of the main air supply pipe $T^6$. The operation of the valve $S$ and thereby of the machine, is controlled by air supplied to the valve $S$ by the hose or flexible pipe $T'$ and the pipe section $T^3$ leading from the outlet chamber $V^5$ of the hand operated valve $V$ which has its inlet chambers $V'$ connected by pipe $T^4$ to the air supply pipe $T^6$. The valve $V$, in its internal parts and mode of operation, is substantially identical with the valve $S$ and comprises parts $V'$ to $V^8$, inclusive, like the parts $S'$ to $S^8$, inclusive. The hollow valve spindle $V^6$ is normally held up in the position shown in Fig. 3, by a spring $V^{15}$ which engages a hood $V^9$ secured to the upper end of the spindle $V^6$ by a screw $V^{10}$ and lock nut $V^{11}$. The head $V^{12}$ of the screw $V^{10}$ forms an adjustable abutment engaged by the operating hand lever $V^{13}$ of the valve, which is pivotally connected to an arm $V^{14}$ forming an extension of the valve casing.

The operation of the mechanism so far described, is as follows: When the hand lever $V^{13}$ of the valve $V$ is depressed, air is admitted to the pipes $T^3$ and $T'$ leading to the chamber $S'$ of the valve $S$. From thence it passes through the chamber $S^5$ and pipe $T^3$ to the chamber in the end casing $F^8$ when the valve $S^3$ is off the seat $S^2$. This is always the case when the mold support is down on the anvil as shown in Fig. 6, for the lever $O$ is then turned into the position in which the spindle $S^6$ of the valve $S$ is elevated. The air thus admitted to the chamber in the end casing $F^8$ acts on the underside of the piston portion $G^3$ of the valve $G$ and moves the valve to the upper limit of its movement. This opens communication between the ports $F'$ and $F^3$, of the valve $F$, and between the ports $F^4$ and $F^2$, and closes communication between the ports $F^3$ and $F^4$. This permits air to pass to the cylinder space $D^2$ from the pipe $T$, thus lifting the mold support above the anvil. After a predetermined upward movement of the mold support governed by the position of the bell crank lever $N$, the roll $N^2$ of the latter engages the arm $L^3$ and forces it from the dotted line position $L^4$ into the dotted line position $L^5$. This, as before explained, cuts off communication between ports $F'$ and $F^3$ without opening communication between ports $F^3$ and $F^4$, or closing communication between ports $F^4$ and $F^2$. The air in the chamber $D^2$ then works expansively to complete the upward stroke of the mold support which is reached in normal operation when the roll $N^2$ of the bell crank lever $O$ engages the arm $Q'$ of the lever $Q$ and turns the latter to depress the valve spindle $S^6$ and permit the valve $S^3$ to seat and close communication between chambers $S'$ and $S^5$ and to open the latter to exhaust through the passage $S^7$. As soon as the chamber $S^5$ of the valve $S$ is opened to exhaust, pressure falls in the chamber in end casing $F^8$ and valve $G$ is returned to its lowermost position by the fluid pressure acting on the exposed end of the portion $G'$ of the valve $G$. The fluid under pressure in the chamber $D^2$ then exhausts into the chamber $B^2$ and the mold support falls until it impinges against the anvil. When impingement occurs the valve lever $Q$ is returned to the position shown in Fig. 6 whereupon the cycle of operation described is repeated and this is continued until pressure on the valve lever V¹³ is released and communication between valve chambers V' and V⁵ is closed. It will of course be understood that the frictional holding means for the lever Q formed by the washers M², spring M⁵, and follower M³, holds the lever Q in either position into which it is positively moved until the lever is positively moved in the opposite direction. The fact that the fluid exhausts from chamber D² into the chamber B² results of course in retarding the downward acceleration of the mold support owing to the back pressure thus produced. This to some extent reduces the efficiency of the following collision in compacting the sand about the patterns, but provided the back pressure and consequently retardation of the falling movement of the mold support is not too great this retardation is a distinct advantage, for I have found that in the operation of molding machines of this character, it is desirable that the sand or other mold forming material should bear with some firmness against the patterns throughout the falling movement of the mold support. This of course does not occur when the mold support, patterns, and mold forming material are permitted to fall freely with the full downward acceleration of gravity. The amount of back pressure and consequent retardation produced by causing the fluid in chamber D² to exhaust into the chamber B² can of course be regulated by properly proportioning the space in the chamber B² to that in the chamber D². The energy of the fluid admitted to the chamber D² is not all wasted because the pressure exerted by this fluid against the piston C' tends to urge the latter upward, and in conjunction with the springs B⁵ gives the anvil an upward velocity at the instant of impact which adds to the effectiveness of collision and assists in destroying the momentum of the mold support without the transmission of the shock of collision to the foundation. It will of course be obvious that whenever the valve G is shifted to admit compressed air to the chamber D², the chamber B² is permitted to exhaust to the atmosphere. By preference I prefer an additional exhaust from the chamber B² in the form of the valve outlet B⁴ which in practice I prefer to leave open in the operation of the machine. This restricted leakage does not allow the pressure fluid to escape from the chamber B² during the upstroke of the anvil rapidly enough to materially affect the efficiency of the machine, and forms a valuable safety device in that it insures the escape from the chamber B² of water which may pass into the chamber with the compressed air.

In the ordinary operation of the machine in jar or jolt ramming as described, the air is first used expansively in the cylinder space D² and then does more work by expanding in the space B². The amount of expansion in the chamber D² is regulated of course by the position of the cut off lever N and the latter should be set to give the proper speed of operation coupled with an efficient use of air. The point in the stroke of the mold support at which the lever N should be set to cut off the air supply to space D² will vary with the load on the mold support. Cut off should occur earlier of course with light loads than with heavy loads. The fact that the main valve is mounted on the anvil and that the latter is reciprocated rapidly in a vertical direction makes the use of the specific cushion devices for the valve G employed of peculiar importance.

C⁶ represents a circular sand guard to keep sand away from the piston C⁷.

While the operation of jarring, carried out as described above, compacts the sand or other mold forming material about the patterns in a highly efficient manner, it is frequently desirable to supplement the jarring action by squeezing the mold. This compacts the mold forming material in the upper portion of the mold. To accomplish this squeezing action I provide a squeezer abutment or crosshead E² adjustably secured to the ends of strain members E' in the form of arms secured to the rock shaft E journaled in bosses B⁶ carried by the base member B. For compactness the shaft E, which of course should extend diametrically across the axis of the machine, passes through a tunnel B³ formed in the lower end of the base member, the piston C' of the anvil being cut away to clear this tunnel. The arrangement of the shaft relative to the base member of the machine and the piston C' is that described and claimed in Patent 891,508, granted June 23, 1908, on an application filed jointly by Harris Tabor and myself. During the jarring operation the squeezer abutment E² is swung to one side as shown in full lines in Fig. 1, and when a mold is to be squeezed it is swung into the dotted line position of Fig. 1. When it is desired to squeeze a mold, and the head E² is in the dotted line position of Fig. 1, compressed air or other fluid under pressure is admitted to the cylinder space B² in the base to lift the anvil, mold support and molds with the proper force. The admission of pressure fluid to the space B², and its exhaust from this space is controlled with the apparatus shown in Figs. 1 to 7, inclusive, so far as the squeezing operation is concerned, by a three-way valve W which has its inlet port W⁴ connected by pipe T¹³ to the pipe T⁴ above the stop valve U in the latter, and which has its outlet port W³ connected by pipe T⁵ and hose T² to a port F¹⁰ opening into the port or chamber F⁴ of the valve F. The valve W, as shown in Fig. 4, is a simple three-way valve comprising rotary cock W⁵ formed with passages W⁶ and W⁷ and which can be turned so that such passages serve to connect the inlet port W⁴ with the port W³ to which the pipe T⁵ is connected, or to connect the port W³ with the exhaust port W² and vent pipe T¹². During the squeezing operation, the exhaust port F² must be closed of course. This may be accomplished by permitting the valve G to occupy its normal inoperative position shown in Fig. 6. This leaves ports F³ and F⁷ in communication, but with such a machine as is shown in Figs. 1 to 7 operating under the usual conditions there is no tendency to move the mold support off the anvil during the initial stage of the squeezing operation. This is due in part to the fact that the cross sectional area of the piston C′ is and should be substantially in excess of the cross sectional area of the piston C², and in part to the lifting effect of the springs B⁵. Even if the mold support should move off the anvil during the initial portion of the squeezing operation no trouble would be caused thereby. Of course it is a simple matter to provide means for cutting off the supply of air to the passage C³ running to the chamber D², if thought necessary. For instance, with the particular valve mechanism shown in Figs. 1 to 7, inclusive, it is only necessary to hold the valve member G in the position corresponding to the dotted line position L⁶ of the lever arm L³ to accomplish this. This may be brought about in any suitable manner as by putting a removable block between the links G⁶ and the top of the valve end casing F⁷ during the squeezing operation, but ordinarily, as indicated, I consider this to be unnecessary.

It has heretofore been proposed to squeeze molds previously compacted by a jarring machine by employing the piston and cylinder of the jarring machine corresponding to the piston C² and cylinder D′ of the machine disclosed herein, to perform the squeezing operation, but this is not as advantageous as the present arrangement. This is because the upward force which must be exerted in the squeezing operation is substantially greater than that required for lifting the mold support in the jarring operation. To make the piston and cylinder employed in the jarring operation effective for the squeezing operation they need to be substantially larger than is required for the jarring operation, and in consequence when the same piston and cylinder is employed for lifting the mold support for both operations a less economical use of air is had in the jarring operation than is had when the piston and cylinder employed in the jarring operation are no larger than necessary for that operation.

The construction shown in Figs. 8 and 9 differs from that shown in Figs. 1 to 7, inclusive, principally in the fact that the exhaust from the chamber D² is directly into the atmosphere through the valve port F². This requires no change in the main valve F or its controlling parts except the omission of the port F⁴ and a slight change in the distance between the valve portions G′ and G² relative to the distance between the ports F′ and F². To retard the downward acceleration of the mold support with the apparatus shown in Fig. 8, a spring X is provided which is received in a socket C⁵ formed in the upper end of the passage C² and acts between the abutment of the piston and the mold support. With the arrangement shown in Fig. 8, pipe T⁹ represents a connection by which pressure fluid may be admitted for lifting the anvil and mold support in squeezing, and for permitting air to flow into and out of the cylinder space B² during the jarring operation in which the piston C′ rises and falls in synchronism with the falling and rising movement of the mold support.

The valve mechanism disclosed herein is in some respects an improvement over the valve mechanism for jar molding machines described and claimed in my prior application Serial No. 501,133, filed June 9, 1909, and certain features novel with me but not claimed herein are claimed in the application last referred to.

While in accordance with the provisions of the statutes I have herein described and illustrated the best forms of my invention now known to me, it will be apparent to those skilled in the art that changes may be made in the form of the apparatus disclosed without departing from the spirit of my invention. It will also be apparent to those skilled in the art that certain features of the invention may be advantageously employed under some conditions without a corresponding use of other features, and I do not wish the claims hereinafter made to be limited to the particular embodiments disclosed more than is made necessary by the state of the art.

Having now described my invention, what I claim as new and desire to secure by Letters Patent, is:

1. In a jar molding machine, the combination of an anvil, a mold support mounted on said anvil and adapted to be lifted above, and to fall back under the action of gravity into impingement with the anvil, of means for retarding the falling movement of the mold support so that its downward acceleration while falling is somewhat less than the full acceleration of gravity.

2. In a jar molding machine, the combination of an anvil, a mold support mounted on said anvil and adapted to be lifted above, and to fall back under the action of gravity into impingement with the anvil, of means providing a resilient cushion for retarding the falling movement of the anvil.

3. In a jar molding machine, the combination of an anvil, a mold support, a piston and cylinder connection between the anvil and mold support, means for exerting a pressure between the piston and cylinder to lift the mold support above the anvil preparatory to collision, and for maintaining a reduced pressure between the mold support and the anvil until the following collision sufficient to appreciably reduce the downward acceleration of the mold support as it moves toward the anvil.

4. In a jar molding machine, the combination of an anvil, a mold support, a piston and cylinder connection between the anvil and mold support, means for exerting a pressure between the piston and cylinder to lift the mold support above the anvil preparatory to collision, and for thereafter maintaining a reduced pressure between the mold support and anvil until the following collision occurs to retard the acceleration of the mold support throughout its downward movement.

5. In a jar molding machine, the combination of an anvil, a mold support, a piston and cylinder connection between the anvil and mold support, a spring acting at all times between the mold support and the anvil and tending to hold them apart but of insufficient strength to do so, and means for alternately admitting fluid under pressure to and permitting it to exhaust from the space in said cylinder to bring about alternate rising and falling movements of the mold support.

6. In a jar molding machine, the combination of an anvil, a mold support, a piston and cylinder connection between the anvil and mold support, a receptacle, means for admitting a pressure fluid to the cylinder to lift it above the anvil preparatory to collision and then permitting it to exhaust into said receptacle whereby a pressure is maintained in the cylinder during the falling movement of the mold support sufficient to retard the acceleration of the latter.

7. In a jar molding machine, the combination of an anvil, a mold support, a piston and cylinder connection between the anvil and mold support, means for alternately connecting the cylinder space to a source of fluid under pressure and to exhaust to produce alternate rising and falling movements of the mold support, and means for restricting the exhaust from the cylinder space throughout the falling movement of the mold support to thereby retard the downward acceleration of the latter.

8. In a molding machine comprising an anvil, a mold support, a piston and cylinder for lifting the mold support above the anvil and permitting it to drop back into engagement with the anvil, a squeezer head, and a second piston and cylinder of larger cross sectional area than the first piston and cylinder for moving the mold support upward to bring a mold carried by said mold support into engagement with said squeezer head.

9. In a jar molding machine, a base member, an anvil, a piston and cylinder connection between the base member and the anvil, a mold support, a piston and cylinder connection between the mold support and the anvil, means providing a resilient cushion between the base and the anvil, and valve mechanism adapted to simultaneously connect the cylinder space of the second mentioned connection to a source of fluid under pressure, and the cylinder space of the first mentioned connection to exhaust and for thereafter connecting the two cylinder spaces together and disconnecting the one from the said source and the other from exhaust.

10. In a jar molding machine, a base, an anvil, a connection between the base and the anvil comprising a piston and cylinder, a mold support, a connection between the anvil and mold support comprising a piston and cylinder, a squeezer head, means for introducing fluid under pressure into the last mentioned cylinder to lift the mold support above the anvil, and means for introducing fluid under pressure to the cylinder forming part of the connection between the anvil and the base to move the anvil and mold support toward said squeezer head.

11. In a jar molding machine, a base, an anvil, a connection between the base and the anvil comprising a piston and cylinder, a mold support, a connection between the anvil and mold support comprising a piston and cylinder, a squeezer head, means for introducing fluid under pressure to the last mentioned cylinder to lift the mold support above the anvil, means providing a resilient cushion between the anvil and the base, and means for introducing fluid under pressure to the cylinder forming part of the connection between the anvil and the base to supplement the lifting action of said resilient cushion, and move the anvil and mold support toward said squeezer head.

12. In a jar molding machine, a base member, an anvil, a piston and cylinder connection between the base member and the anvil, a mold support, a piston and cylinder connection between the anvil and mold support, means providing a resilient cushion between the base and the anvil, and valve mechanism provided with an inlet port connected to a source of fluid under pressure, a second port connected to the cylinder of the second mentioned connection, a third port connected to the cylinder of the first mentioned connection, and an exhaust port, and means for simultaneously connecting the inlet and said second ports together, and said third and exhaust ports together, and for alternately therewith closing communication between the inlet and said second port and between said third and exhaust ports, and simultaneously therewith opening communication between said second and third ports.

13. In a jar molding machine, a base member, an anvil, a piston and cylinder connection between the base member and the anvil, a mold support, a piston and cylinder connection between the anvil and mold support, means providing a resilient cushion between the base and the anvil, and valve mechanism provided with an inlet port connected to a source of fluid under pressure, a second port connected to the cylinder of the second mentioned connection, a third port connected to the cylinder of the first mentioned connection, and an exhaust port, and a valve member movable from one position in which communication between said second and third ports is closed and communication is established between said inlet and second ports and between said third and exhaust ports, to an intermediate position in which said second ports is closed, and into a third position in which communication between the inlet and said second port is closed and in which communication between said third port and the exhaust port is also closed, and in which communication between said second and third ports is established.

14. In a jar molding machine, a base member, an anvil, a piston and cylinder connection between the base member and the anvil, a mold support, a piston and cylinder connection between the anvil and mold support, means providing a resilient cushion between the base and the anvil, and valve mechanism provided with an inlet port connected to a source of fluid under pressure, a second port connection to the cylinder of the second mentioned connection, a third port connected to the cylinder of the first mentioned connection, and an exhaust port, and a valve member movable from one position in which communication between said second and third ports is closed and communication is established between said inlet and second ports and between said third and exhaust ports, to an intermediate position in which the inlet and said second ports are both closed, and to a third position in which communication between the inlet and said second port is closed and in which communication between said third port and the exhaust port is also closed, and in which communication between said second and third ports is established, and a second supply connection independent of said inlet port adapted to be connected to the cylinder of said first mentioned connection.

15. In a jar molding machine, the combination with the anvil member and the relatively movable mold support member having coöperating piston and cylinder parts, of means controlling the admission to and exhaust from the cylinder of pressure fluid for lifting the mold support above, and allowing it to drop back into engagement with the anvil, said means comprising a valve mechanism supported in fixed relation to one of said members, and a valve actuating device carried by the other of said members, and a connection extending away from said device whereby it may be adjusted relative to said member while the machine is in operation, said device acting on the valve mechanism to cut off the admission of pressure fluid after a movement of the mold support away from the anvil, fixed by the adjustment of said device relative to the member carrying it.

16. In a jar molding machine, the combination with the anvil member and the relatively movable mold support member having coöperating piston and cylinder parts, of means controlling the admission to and exhaust from the cylinder of pressure fluid for lifting the mold support above, and allowing it to drop back into engagement with the anvil, said means comprising a valve mechanism supported in fixed relation to one of said members, and a valve actuating device carried by the other of said members, and a connection extending away from said device whereby it may be adjusted relative to said member while the machine is in operation, said device acting on the valve mechanism to open said cylinder space to exhaust after a movement of the mold support fixed by the adjustment of said device relative to the member carrying device.

17. In a jar molding machine, the combination with the anvil member and the relatively movable mold support member having coöperating piston and cylinder parts, of means controlling the admission to and exhaust from the cylinder, of pressure fluid for lifting the mold support above, and allowing it to drop back into engagement with the anvil, comprising a valve mechanism carried by the anvil, a valve actuator carried by the mold support and a connection extending away from said valve actuator for adjusting the position of said actuator relative to the mold support while the machine is in operation.

18. In a jar molding machine, the combination with the anvil member and relatively movable mold support member having coöperating piston and cylinder parts, of means controlling the admission to and exhaust from the cylinder, a pressure fluid for lifting the mold support above, and allowing it to drop back into engagement with, the anvil, comprising a valve mechanism carried by the anvil, a valve actuator in the form of a lever arm pivoted to the mold support and a connection including an elongated horizontally disposed connecting rod for turning said arm relative to said mold support.

19. In a jar molding machine, the combination with the anvil member and the relatively movable mold support member having coöperating piston and cylinder parts, of means controlling the admission to and exhaust from the cylinder of pressure fluid for lifting the mold support above the anvil and allowing it to drop back, comprising a valve mechanism supported in fixed relation to one of said members, and a pair of valve actuating devices carried by the other of said members, and connections extending away from said devices whereby they may be adjusted relative to said member while the machine is in operation, said devices being arranged one to cut off the admission of pressure fluid after a predetermined movement of the mold support away from the anvil and the other to open the cylinder space to exhaust after a further movement of the mold support away from the anvil.

20. In a jar molding machine, a base member, an anvil, a piston and cylinder connection between the base member and the anvil, a mold support, a piston and cylinder connection between the mold support and the anvil, springs interposed between the base and the anvil, and valve mechanism adapted to simultaneously connect the cylinder space of the second mentioned connection to a source of fluid under pressure, and the cylinder space of the first mentioned connection to exhaust, and for thereafter connecting the two cylinder spaces together and disconnecting the one from exhaust and the other from said source, the cylinder of said first mentioned connection being provided with a normally open restricted leakage passage leading from the lower end of the cylinder space.

21. In a jar molding machine, a base member, an anvil, a piston and cylinder connection between the base member and the anvil, a mold support, means for alternately lifting the mold support above, and allowing it to drop back into engagement with, the anvil, springs interposed between the anvil and the base, and means for introducing air under pressure to the cylinder space of said connection, the cylinder of said connection being provided with a normally open restricted leakage passage leading from the lower end of the cylinder space.

22. In a jar molding machine, a base member and anvil, a piston and cylinder connection between the base member and the anvil, a resilient cushion between the base member and the anvil, a mold support, means for lifting the mold support above, and allowing it to drop back into engagement with the base, and a connection to the cylinder space of said connection through which air may enter said space when the mold support is falling and the anvil is rising, and through which air may freely escape from said space when the anvil thereafter descends.

WILFRED LEWIS.

Witnesses:
 ARNOLD KATZ,
 D. STEWART.